United States Patent
Föttinger et al.

(10) Patent No.: US 6,730,753 B2
(45) Date of Patent: May 4, 2004

(54) CATALYST SYSTEMS OF THE ZIEGLER-NATTA TYPE AND A PROCESS FOR PREPARING THEM

(75) Inventors: Klaus Föttinger, Mannheim (DE); Stephan Hüffer, Ludwigshafen (DE); Rainer Karer, Kaiserslautern (DE)

(73) Assignee: Basell Polyolefine GmbH

( * ) Notice: Subject to any disclaimer, the term of this patent is extended or adjusted under 35 U.S.C. 154(b) by 0 days.

(21) Appl. No.: 09/940,368

(22) Filed: Aug. 28, 2001

(65) Prior Publication Data

US 2002/0095014 A1 Jul. 18, 2002

(30) Foreign Application Priority Data

Aug. 30, 2000 (DE) .......................... 100 42 403

(51) Int. Cl.$^7$ .............................. C08F 4/64; C08F 4/642
(52) U.S. Cl. ................. 526/128; 526/124.6; 526/125.3; 526/348; 526/348.1; 502/109; 502/116; 502/133
(58) Field of Search .............. 526/128, 124.6, 526/125.3, 348, 348.1; 502/109, 116, 133

(56) References Cited

U.S. PATENT DOCUMENTS

| | | | |
|---|---|---|---|
| 3,242,150 A | | 3/1966 | Scoggin ................. 260/88.2 |
| 3,248,179 A | | 4/1966 | Norwood ................. 23/285 |
| 4,396,534 A | * | 8/1983 | Matsuura et al. ........... 252/429 |
| 4,970,184 A | * | 11/1990 | Schauss et al. ............ 502/107 |

FOREIGN PATENT DOCUMENTS

| | | |
|---|---|---|
| DE | 3538577 | 5/1987 |
| EP | 120503 | 4/1987 |
| EP | 129368 | 7/1989 |
| EP | 212519 | 8/1989 |
| EP | 089691 | 11/1989 |
| EP | 225452 | 1/1990 |
| EP | 0341539 | 11/1990 |
| EP | 004645 | 7/1991 |
| EP | 241947 | 10/1992 |
| EP | 0416815 | 8/1997 |
| EP | 653286 | 10/1999 |
| EP | 420436 | 7/2000 |
| JP | 170947 | 7/1993 |
| WO | WO 98/03559 | 1/1998 |
| WO | WO 98/27124 | 6/1998 |

* cited by examiner

Primary Examiner—David W. Wu
Assistant Examiner—R. Rabago
(74) Attorney, Agent, or Firm—Connolly Bove Lodge & Hutz LLP

(57) ABSTRACT

Catalyst systems of the Ziegler-Natta type, which are suitable for the polymerization of olefins are prepared by:

A) bringing an inorganic metal oxide on which a magnesium compound has been deposited into contact with a tetravalent titanium compound, B) if desired, bringing the intermediate obtained in this way into contact with an electron donor compound and C) bringing the intermediate obtained in step A) or B) into contact with a polysiloxane.

13 Claims, No Drawings

CATALYST SYSTEMS OF THE ZIEGLER-NATTA TYPE AND A PROCESS FOR PREPARING THEM

The present invention relates to catalyst systems of the Ziegler-Natta type, to a process for preparing them, to a process for the polymerization of olefins and to polymers and copolymers obtainable in this way.

Catalyst systems of the Ziegler-Natta type have been known for a long time. These systems are used, in particular, for the polymerization of $C_2$–$C_{10}$-alk-1-enes and comprise, inter alia, compounds of polyvalent titanium, aluminum halides and/or aluminum alkyls and also a suitable support material. The Ziegler-Natta catalysts are usually prepared in two steps. Firstly, the titanium-containing solid component is prepared. This is subsequently reacted with the cocatalyst. The polymerization is subsequently carried out with the aid of the catalysts obtained in this way.

To avoid the formation of hydrocarbon-soluble polymer in the (co)polymerization of ethylene with α-olefins, a Lewis base is often used as a further component in the Ziegler-Natta catalysts. Thus, for example, siloxanes are used as further catalyst component in EP-A-225452, carboxylic esters, ketones and amines are used in DE-A-3538577 to 3538580 and aliphatic ethers are used in EP-A-212519.

The process known from EP-B-341539 gives, in the gas phase, polymers which have a comparatively low proportion of fines. The catalyst used comprises $TiCl_3 \cdot nAlCl_3$, where n is from 0 to 0.5, as active component, a magnesium-containing component, a polysiloxane, silica gel as support component, an aluminum alkyl compound and a Lewis base. Although the use of the polysiloxane further reduces the proportion of hydrocarbon-soluble polymer and significantly improves the morphology of the polymer, the activity of the catalyst system is greatly reduced by the presence of the polysiloxane.

It is an object of the present invention to develop, starting from the catalyst system described in EP-B-341539, an improved catalyst system of the Ziegler-Natta type which no longer has the abovementioned disadvantage of a reduced activity when using polysiloxanes.

We have found that this object is achieved by a process for preparing catalyst systems of the Ziegler-Natta type, which comprises the following steps:

A) bringing an inorganic metal oxide on which a magnesium compound has been deposited into contact with a tetravalent titanium compound, B) optionally, bringing the intermediate obtained in this way into contact with an electron donor compound and C) bringing the intermediate obtained in step A) or B) into contact with a polysiloxane.

In view of the prior art, it was surprising that it was not only possible to overcome the disadvantage of the prior art by use of tetravalent titanium compounds in the process of the present invention, but the activity of the catalyst system is also significantly increased by the addition of the polysiloxane.

The present invention further provides catalyst systems of the Ziegler-Natta type which can be prepared by the process of the present invention and a process for the polymerization or copolymerization of olefins at from 20 to 150° C. and pressures of from 1 to 100 bar, wherein the polymerization or copolymerization is carried out in the presence of at least one catalyst system according to the present invention and an aluminum compound as cocatalyst.

Furthermore, the invention provides homopolymers of ethylene and copolymers of ethylene with α-olefins obtainable by the polymerization process of the present invention, provides for their use for producing films, fibers and moldings and provides films, fibers and moldings which comprise homopolymers and copolymers of ethylene according to the present invention.

The inorganic metal oxide used in step A) has a magnesium compound deposited on it, where the amount of magnesium compound is generally from 1 to 200% by weight of the inorganic metal oxide, preferably from 1 to 100% by weight of the inorganic metal oxide and particularly preferably from 1 to 10% by weight of the inorganic metal oxide. The magnesium compound is generally uniformly distributed over the inorganic metal oxide. The inorganic metal oxide on which the magnesium compound has been deposited can be prepared by a process comprising the following steps:

a) optionally, bringing an inorganic metal oxide into contact with an organometallic compound of group 13 of the Periodic Table, (according to IUPAC 1985)

b) bringing the intermediate obtained in step a) or the inorganic metal oxide into contact with a magnesium compound $MgR_nX_{2-n}$, where X are each, independently of one another, fluorine, chlorine, bromine, iodine, hydrogen, $NR_2$, OR, SR, $SO_3R$ or OC(O)R, and R are each, independently of one another, a linear, branched or cyclic $C_1$–$C_{20}$-alkyl, a $C_2$–$C_{10}$-alkenyl, an alkylaryl having 1–10 carbon atoms in the alkyl part and 6–20 carbon atoms in the aryl part or a $C_6$–$C_{18}$-aryl and n is 1 or 2, and subsequently c) bringing the intermediate obtained in step b) into contact with an alcohol of the formula R—OH, where R is as defined under b).

R is an independent variable which is used a number of times in the description and has the following meanings for all compounds: R is in each case independently a linear, branched or cyclic $C_1$–$C_{20}$-alkyl such as methyl, ethyl, n-propyl, isopropyl, n-butyl, sec-butyl, isobutyl, tert-butyl, n-pentyl, sec-pentyl, isopentyl, n-hexyl, n-heptyl, n-octyl, n-nonyl, n-decyl or n-dodecyl, cyclopropyl, cyclobutyl, cyclopentyl, cyclohexyl, cycloheptyl, cyclooctyl, cyclononyl or cyclododecyl, a $C_2$–$C_{10}$-alkenyl which may be linear, cyclic or branched and can have an internal or terminal double bond, e.g. vinyl, 1-allyl, 2-allyl, 3-allyl, butenyl, pentenyl, hexenyl, cyclopentenyl, cyclohexenyl, cyclooctenyl or cyclooctadienyl, an alkylaryl having 1–10 carbon atoms in the alkyl part and 6–20 carbon atoms in the aryl part, e.g. benzyl, o-, m-, p-methylbenzyl, 1- or 2-ethylphenyl, or a $C_6$–$C_{18}$-aryl which may bear further alkyl groups as substituents, e.g. phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, 2-biphenyl, o-, m-, p-methylphenyl, 2,3-, 2,4-, 2,5- or 2,6-dimethylphenyl, 2,3,4-, 2,3,5-, 2,3,6-, 2,4, 5-, 2,4,6- or 3,4,5-trimethylphenyl, and two radicals R may also be joined to form a 5- or 6-membered ring and the organic radicals R may also be substituted by halogens, e.g. fluorine, chlorine or bromine.

X is also a variable used a number of times in the description and is in each case independently a fluorine, chlorine, bromine, iodine or hydrogen atom or an amide group $NR_2$, an alkoxide group OR, a thiolate group SR, a sulfonate group $SO_3R$ or a carboxylate group OC(O)R, where R is as defined above. Examples of $NR_2$ are dimethylamino, diethylamino and diisopropylamino, examples of OR are methoxy, ethoxy, isopropoxy, butoxy, hexoxy and 2-ethylhexoxy, examples of SO₃R are methylsulfonate, trifluoromethylsulfonate and toluenesulfonate and examples of OC(O)R are formate, acetate and propionate.

The inorganic metal oxide is preferably firstly reacted in step a) with an organometallic compound $MR_mX_{3-m}$, where R is as defined above, M is a metal of group 13 of the Periodic Table, preferably B, Al or Ga and particularly preferably Al, and m is 1, 2 or 3.

The organometallic compound of group 13 of the Periodic Table which is used is preferably an aluminum compound $AlR_mX_{3-m}$, where the variables are as defined above. Examples of suitable compounds are trialkylaluminum compounds such as trimethylaluminum, triethylaluminum, triisobutylaluminum or tributylaluminum, dialkylaluminum halides such as dimethylaluminum chloride, diethylaluminum chloride or dimethylaluminum fluoride, alkylaluminum dihalides such as methylaluminum dichloride or ethylaluminum dichloride, or mixtures such as methylaluminum sesquichloride. The hydrolysis products of aluminum alkyls with alcohols can also be used. Preference is given to using dialkylaluminum halides and particular preference is given to using dimethylaluminum chloride or diethylaluminum chloride.

The inorganic metal oxide used is, for example, silica gel, aluminum oxide, hydrotalcite, mesoporous materials and aluminosilicate, in particular silica gel.

The inorganic metal oxide can also be partially or fully modified prior to the reaction in step a) or b). The support material can, for example, be treated at from 100 to 1000° C. under oxidizing or nonoxidizing conditions, if desired in the presence of fluorinating agents such as ammonium hexafluorosilicate. It is thus possible, inter alia, to vary the water and/or OH content. The support material is preferably dried at from 100 to 300° C. under reduced pressure for from 1 to 10 hours before it is used in the process of the present invention.

In general, the inorganic metal oxide has a mean particle diameter of from 5 to 200 μm, preferably from 10 to 100 μm, and particularly preferably from 20 to 70 μm, a pore volume of from 0.1 to 10 ml/g, in particular from 1.0 to 4.0 ml/g, and a specific surface area of from 10 to 1000 m²/g, in particular from 100 to 600 m²/g. The inorganic metal oxide is preferably spherical.

The specific surface area and the mean pore volume are determined by nitrogen adsorption using the BET method as described, for example, by S. Brunauer, P. Emmett and E. Teller in Journal of the American Chemical Society, 60, (1939), pages 209–319.

Very particular preference is given to using spray-dried silica gel as inorganic metal oxide. In general, the primary particles of the spray-dried silica gel have a mean particle diameter of from 1 to 10 μm, in particular from 1 to 5 μm. The primary particles are porous, granular silica gel particles which are obtained by milling an $SiO_2$ hydrogel, if desired followed by appropriate sieving. The spray-dried silica gel can then be produced by spray drying a slurry of the primary particles in water or an aliphatic alcohol. However, such a silica gel is also commercially available. The spray-dried silica gel obtainable in this way also has voids or channels having a mean diameter of from 1 to 10 μm, in particular from 1 to 5 μm, and a macroscopic proportion by volume of the total particle in the range from 5 to 20%, in particular from 5 to 15%. These voids or channels usually have a positive effect on the diffusion-controlled supply of monomers and cocatalysts to the catalyst and thus also on the polymerization kinetics.

Step a) can be carried out in any aprotic solvent. Particularly suitable solvents are aliphatic and aromatic hydrocarbons in which the organometallic compound of group 13 of the Periodic Table is soluble, e.g. pentane, hexane, heptane, octane, dodecane, a benzene or a $C_7$–$C_{10}$-alkylbenzene such as toluene, xylene or ethylbenzene. A particularly preferred solvent is ethylbenzene.

The inorganic metal oxide is usually slurried in the aliphatic or aromatic hydrocarbon, after which the organometallic compound is added thereto. The organometallic compound can be added as such or else as a solution in an aliphatic or aromatic hydrocarbon, preferably pentane, hexane, heptane or toluene. However, it is also possible, for example, to add the solution of the organometallic compound to the dry inorganic metal oxide. Reaction step a) can be carried out at from 0 to 100° C., preferably from 20 to 50° C. The reaction times are generally in the range from 1 minute to 2 hours, preferably from 5 minutes to 1 hour.

The organometallic compound is usually used in an amount of from 0.05 to 10 mmol, preferably from 0.2 to 5 mmol and particularly preferably from 0.4 to 2 mmol, per g of inorganic metal oxide.

In step b), the material obtained from step a) is, usually without work-up or isolation, reacted with the magnesium compound. Suitable magnesium compounds are, in particular, magnesium halides, magnesium alkyls and magnesium aryls, and also magnesium alkoxy and magnesium aryloxy compounds, with preference being given to using magnesium dichloride, magnesium dibromide and di-($C_1$–$C_{10}$-alkyl)magnesium compounds. Particular preference is given to using magnesium compounds $MgR_2$, e.g. dimethylmagnesium, diethylmagnesium, dibutylmagnesium or butyloctylmagnesium, owing to, inter alia, their good solubility. In mixed compounds such as butyloctylmagnesium, the radicals R can be present in various ratios to one another, e.g. preference is given to using (butyl)$_{1.5}$(octyl)$_{0.5}$ magnesium.

Suitable solvents for step b) are the same ones as for step a). The reaction is usually carried out at from 0 to 150° C., preferably from 20 to 100° C. and particularly preferably from 30 to 70° C. The reaction times are generally in the range from 1 minute to 5 hours, preferably from 10 minutes to 3 hours and particularly preferably from 30 minutes to 2 hours.

The magnesium compound is usually used in an amount of from 0.5 to 20 mmol, preferably from 1 to 10 mmol and particularly preferably from 2 to 5 mmol, per g of inorganic metal oxide.

The intermediate obtained in step b) is usually reacted without intermediate isolation with one or more alcohols of the formula R—OH, where the variable R is as defined above. Examples of suitable alcohols are methanol, ethanol, 1-propanol, 2-propanol, 1-butanol, 2-butanol, 1-pentanol, 2-pentanol, 1-hexanol, 2-ethylhexanol, 2,2-dimethylethanol and 2,2-dimethylpropanol, in particular ethanol, 1-propanol, 1-butanol, 1-pentanol, 1-hexanol and 2-ethylhexanol.

Solvents suitable for step c) are the same ones as for step a). The reaction is usually carried out at from 0 to 80° C., preferably from 10 to 50° C. and particularly preferably from 20 to 40° C. The reaction times are generally in the range from 1 minute to 5 hours, preferably from 10 minutes to 3 hours and particularly preferably from 30 minutes to 2 hours.

The molar ratio of alcohol used to magnesium compound used is usually in a range from 0.1:10 to 20:1, preferably from 0.5:10 to 10:1 and particularly preferably from 1:1 to 2:1.

The resulting inorganic metal oxide on which the magnesium compound has been deposited can then be used directly for step A). However, it is preferably isolated. This can be achieved by, for example, distilling off the solvent or preferably by filtration and washing with an aliphatic hydrocarbon such as pentane, hexane or heptane. This can be followed by a drying step in which all or some of the residual solvent is removed.

The inorganic metal oxide on which the magnesium compound has been deposited is brought into contact with the tetravalent titanium compound in step A). Titanium compounds used are generally compounds of tetravalent titanium of the formula $(RO)_s X_{4-s} Ti$, where the radicals R and X are as defined above and s is from 0 to 4. Suitable compounds are, for example, tetraalkoxytitaniums such as tetramethoxytitanium, tetraethoxytitanium, tetrapropoxytitanium, tetraisopropoxytitanium, tetrabutoxytitanium or titanium(IV) 2-ethylhexoxide, trialkoxytitanium halides such as titanium chloride triisopropoxide and titanium tetrahalides. Preference is given to titanium compounds in which X is fluorine, chlorine, bromine or iodine, particularly preferably chlorine. Very particular preference is given to using titanium tetrachloride.

The inorganic metal oxide on which the magnesium compound has been deposited is usually slurried in a suspension medium, after which the titanium compound is added thereto. However, it is also possible to dissolve the titanium compound in the suspension medium and subsequently to add the inorganic metal oxide on which the magnesium compound has been deposited. The titanium compound is preferably soluble in the suspension medium. Suitable suspension media are, in particular, aliphatic and aromatic hydrocarbons such as pentane, hexane, heptane, octane, dodecane, benzene or a $C_7$–$C_{10}$-alkylbenzene such as toluene, xylene or ethylbenzene. A particularly preferred solvent is ethylbenzene. Reaction step A) is usually carried out at from 0 to 100° C., preferably from 20 to 50° C. The reaction times are generally in the range from 1 minute to 2 hours, preferably from 1 minute to 1 hour.

The molar ratio of titanium compound used to magnesium compound used is generally in the range from 20:1 to 0.05:1, preferably from 10:1 to 0.5:1 and particularly preferably from 4:1 to 1:1. In addition, the amount of titanium compound used is usually selected so that from 0.1 to 20 mmol, preferably from 0.5 to 15 mmol and particularly preferably from 1 to 10 mmol, are present per g of inorganic metal oxide.

The intermediate obtained from step A) can, if desired, be brought into contact with an electron donor compound, for example monofunctional or polyfunctional carboxylic acids, carboxylic anhydrides and carboxylic esters, also ketones, ethers, alcohols, lactones and organophosphorus and organosilicon compounds. Preference is given to using an electron donor compound or a mixture thereof. The choice of suitable donor compounds depends, for example, on the monomers to be polymerized. In general, simple electron donor compounds such as diethyl ketone, dibutyl ether or tetrahydrofuran tend to be used for homopolymerization and copolymerization of ethylene, while in the polymerization of propene, preference is given to using electron donor compounds such as phthalic esters, diesters of 3- or 4-membered, substituted or unsubstituted cycloalkyl-1,2-dicarboxylic acids and also monoesters of substituted or unsubstituted benzophenone-2-carboxylic acids. The hydroxy compounds used in the esterification reactions to form these esters are customary alcohols including $C_1$–$C_{15}$-alkanols, $C_5$–$C_7$-cycloalkanols which may in turn bear $C_1$–$C_{10}$-alkyl groups and also $C_6$–$C_{10}$-phenols. For the polymerization of propene, preference is given to using methyl phthalate, ethyl phthalate, propyl phthalate or butyl phthalate.

The component from step A) is preferably reacted without intermediate isolation at from 0 to 100° C., preferably from 20 to 50° C. The reaction times are generally from 1 minute to 2 hours, preferably from 1 minute to 1 hour.

In general, the ratio of titanium compound used to electron donor compound used is in the range from 15:1 to 0.5:1, preferably from 10:1 to 1:1 and particularly preferably from 8:1 to 2:1.

In step C), the intermediate obtained in step A) or B) is brought into contact with a polysiloxane of the formula

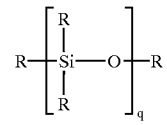

where the variable R is as defined above and the index q is an integer from 3 to 4000. The viscosities of such polysiloxanes are generally in the range from 1 to $10^6$ mpa·s. Polysiloxanes are described, for example, in Ullmann's Encyclopedia of Industrial Chemistry, Sixth Edition, 1999 Electronic Release, under the keyword 'Silicones'. Preferred radicals R on the polysiloxane are methyl, ethyl, propyl and phenyl, in particular methyl. Polysiloxanes are obtainable, for example, from Wacker under the name silicone oil AK 150 to 500 000. Preference is given to polysiloxanes having an index q of greater than 100, particularly preferably greater than 1000. Preference is given to polysiloxanes having viscosities of from 100 to 500 000 mpa·s, particularly preferably from 10 000 to 300 000 mpa·s.

The intermediate from step A) or B), preferably the intermediate from step B), is preferably reacted without intermediate isolation with the polysiloxane at from 0 to 100° C., preferably from 20 to 40° C. The reaction times are generally in the range from 1 minute to 5 hours, preferably from 10 minutes to 2 hours.

The polysiloxane is generally used in an amount of from 1 to 50% by weight, preferably from 5 to 40% by weight and particularly preferably from 10 to 30% by weight, based on the inorganic metal oxide used.

After step C), the solvent is preferably removed from the catalyst system, e.g. by distilling off the solvent or preferably by filtration. The novel catalyst system obtained in this way can subsequently be washed one or more times with an aliphatic hydrocarbon such as pentane, hexane or heptane. This is preferably followed by a drying step in which all or some of the residual solvent is removed. The novel catalyst system obtained in this way can be completely dry or have a certain residual moisture content. However, the volatile constituents should make up no more than 20% by weight, in particular no more than 10% by weight, of the catalyst system.

The novel catalyst system which can be obtained in this way advantageously has a titanium content of from 0.1 to 30% by weight, preferably from 0.5 to 20% by weight and particularly preferably from 1 to 10% by weight.

The process for the polymerization or copolymerization of olefins in the presence of at least one catalyst system according to the present invention and an aluminum compound as cocatalyst is carried out at from 20 to 150° C. and pressures of from 1 to 100 bar.

The process of the present invention for the polymerization of olefins can be combined with all industrially known polymerization processes at from 20 to 150° C. and under pressures of from 5 to 100 bar. The advantageous pressure and temperature ranges for carrying out the process accordingly depend greatly on the polymerization method. Thus, the catalyst systems used according to the present invention can be employed in all known polymerization processes, i.e., for example, in suspension polymerization processes, in solution polymerization processes or in gas-phase polymerization.

Among the abovementioned polymerization processes, gas-phase polymerization, in particular in gas-phase fluidized-bed reactors, solution polymerization and suspension polymerization, in particular in loop reactors and stirred tank reactors, is preferred. Suitable gas-phase fluidized-bed processes are described in detail in, for example, EP-A-0 004 645, EP-A-0 089 691, EP-A-0 120 503 or EP-A-0 241 947. If desired, various or like polymerization processes can also be connected in series so as to form a polymerization cascade. The molar mass of the poly-1-alkenes formed can be controlled by addition of regulators customary in the polymerization techniques, for example hydrogen, and can be set over a wide range. Furthermore, the product adduct can be varied via the amount of Ziegler catalyst metered in. The (co)polymer products can then be passed to a deodorizing or deactivation vessel in which they can be subjected to a customary and known nitrogen and/or steam treatment.

A particularly preferred process is the suspension polymerization process in which polymerization is customarily carried out in a suspension medium, for example in an alkane such as propane, isobutane or pentane. The polymerization temperatures are generally in the range from 20 to 115° C. and the pressure is generally in the range from 1 to 100 bar. The solids content of the suspension is generally in the range from 10 to 80%. The process can be carried out either batchwise, e.g. in stirring autoclaves, or continuously, e.g. in tube reactors, preferably in loop reactors. In particular, the Phillips PF process as described in U.S. Pat. No. 3,242,150 and U.S. Pat. No. 3,248,179 can be employed.

The process of the present invention allows various olefinically unsaturated compounds to be polymerized. For the purposes of the present invention, the term polymerization also encompasses copolymerization. Possible olefins are ethylene and α-olefins having from 3 to 12 carbon atoms, e.g. propene, 1-butene, 1-pentene, 1-hexene, 1-heptene, 1-octene, 1-nonene, 1-decene or 1-dodecene, and also nonconjugated and conjugated dienes such as butadiene, 1,5-hexadiene or 1,6-heptadiene, cyclic olefins such as cyclohexene, cyclopentene or norbornene and polar monomers such as acrylic esters, acrolein, acrylonitrile, vinyl ethers, allyl ethers and vinyl acetate. Vinylaromatic compounds such as styrene can also be polymerized by the process of the present invention. Preference is given to polymerizing at least one olefin selected from the group consisting of ethene, propene, 1-butene, 1-pentene, 1-hexene, 1-heptene, 1-octene and 1-decene, in particular ethene. In a preferred embodiment of the process of the present invention, mixtures of ethylene with $C_3$–$C_{12}$-α-olefins, in particular $C_3$–$C_8$-α-monoolefins, are copolymerized (this also includes mixtures of three or more olefins). In a further preferred embodiment of the process of the present invention, ethylene is copolymerized with an olefin selected from the group consisting of propene, 1-butene, 1-pentene, 1-hexene, 1-heptene and 1-octene. Particularly these latter olefins can, in the liquefied or liquid state, also form the suspension medium or solvent in the polymerization or copolymerization reaction.

The catalyst systems of the present invention are themselves sometimes not polymerization-active or have a low polymerization activity and are then brought into contact with an aluminum compound as cocatalyst in order to be able to display good polymerization activity. Aluminum compounds suitable as cocatalyst are, in particular, compounds of the formula $AlR_mX_{3-m}$, where the variables are as defined above. Compounds suitable as cocatalyst are, in particular, trialkylaluminums and compounds of this type in which one or two alkyl groups have been replaced by alkoxy groups, in particular $C_1$–$C_{10}$-dialkylaluminum alkoxides such as diethylaluminum ethoxide, or by one or two halogen atoms, for example chlorine or bromine, in particular dimethylaluminum chloride, methylaluminum dichloride, methylaluminum sesquichloride or diethylaluminum chloride. Preference is given to using trialkylaluminum compounds whose alkyl groups each have from 1 to 15 carbon atoms, for example trimethylaluminum, methyldiethylaluminum, triethylaluminum, triisobutylaluminum, tributylaluminum, trihexylaluminum or trioctylaluminum. Cocatalysts of the aluminoxane type can also be used, in particular methylaluminoxane MAO. Aluminoxanes are prepared, for example, by controlled addition of water to alkylaluminum compounds, in particular trimethylaluminum. Aluminoxane preparations suitable as cocatalysts are also commercially available.

The amount of aluminum compounds to be used depends on their effectiveness as cocatalysts. Since many of the cocatalysts are at the same time used for removing catalyst poisons (used as scavengers), the amount used depends on the impurities present in the other starting materials. However, a person skilled in the art can determine the optimal amount by simple experimentation. The cocatalyst is preferably used in such an amount that the atomic ratio of aluminum from the aluminum compound used as cocatalyst to titanium from the catalyst system of the present invention is from 10:1 to 800:1, in particular from 20:1 to 200:1.

The various aluminum compounds can be used as cocatalyst in any order, either individually or as a mixture of two or more components. Thus, these aluminum compounds acting as cocatalysts can be allowed to act either successively or together on the catalyst systems of the present invention. The catalyst system of the present invention can be brought into contact with the cocatalyst or cocatalysts either before or after it is brought into contact with the olefins to be polymerized. Preactivation using one or more cocatalysts prior to mixing with the olefin and further addition of identical or different cocatalysts after the preactivated mixture has been brought into contact with the olefin are also possible. Preactivation is usually carried out at from 0 to 150° C., in particular from 20 to 80° C., and pressures of from 1 to 100 bar, in particular from 1 to 40 bar.

In order to obtain a broad product spectrum, the catalyst systems of the present invention can also be used in combination with at least one catalyst customary for the polymerization of olefins. Catalysts which can be used here are, in particular, Phillips catalysts based on chromium oxides, metallocenes (cf. EP-A-129368), constrained geometry complexes (cf., for example, EP-A-0416815 or EP-A-0420436), nickel and palladium bisimine systems (for the preparation of these, see WO-A-98/03559), iron and cobalt pyridinebisimine compounds (for the preparation of these, see WO-A-98/27124) or chromium amides (cf., for example, 95JP-170947). Such combinations make it possible, for example, to produce bimodal products or to generate comonomers in situ. In such cases, the catalyst system of the present invention is preferably used in the presence of at least one catalyst customary for the polymerization of olefins and, if desired, one or more cocatalysts. The catalysts customary for the polymerization of olefins can have been applied to the same inorganic metal oxide or be immobilized on another support material and be used simultaneously with the catalyst system of the present invention or the catalysts can be used sequentially in any order.

The process of the present invention makes it possible to prepare olefin polymers having molar masses in the range from about 10 000 to 5 000 000, preferably from 20 000 to 1 000 000, with polymers having weight average molar masses of from 20 000 to 400 000 being particularly preferred.

The catalyst systems of the present invention are particularly suitable for preparing homopolymers of ethylene and copolymers of ethylene with α-olefins. Thus, homopolymers of ethylene and copolymers of ethylene with up to 10% by weight of $C_3$–$C_{12}$-α-olefins can be prepared. Preferred copolymers contain from 0.3 to 1.5 mol % of hexene, based on the polymer, and particularly preferably from 0.5 to 1 mol % of hexene.

The polymer of the present invention can also form mixtures with other olefin polymers, in particular homopolymers and copolymers of ethylene. These mixtures can, on the one hand, be produced by the above-described simultaneous polymerization using a plurality of catalysts. On the other hand, these mixtures can also be obtained simply by subsequent blending of the polymers of the present invention with other homopolymers or copolymers of ethylene.

Furthermore, the polymers, ethylene copolymers, polymer mixtures and blends can further comprise auxiliaries and/or additives known per se, for example processing stabilizers, stabilizers against the action of light and heat, customary additives such as lubricants, antioxidants, antiblocking agents and antistatics, and also, if desired, colorants. A person skilled in the art will be familiar with the types and amounts of these additives.

The polymers of the present invention can also be modified afterwards by grafting, crosslinking, hydrogenation, functionalization or other modification reactions which are known to those skilled in the art.

Owing to their good mechanical properties, the olefin polymers and copolymers prepared using the catalyst systems of the present invention, in particular the homopolymers and copolymers of ethylene, are especially suitable for the production of films, fibers and moldings.

Compared to the same catalyst system without polysiloxane, the catalyst system of the present invention displays a significantly higher productivity, particularly in suspension polymerizations. The polymers which can be obtained in this way also have a high bulk density and a low residual chlorine content.

EXAMPLES AND COMPARATIVE EXPERIMENTS

Example 1
Preparation of the Inorganic Metal Oxide on which a Magnesium Compound has been Deposited In a first step, 131.5 g of finely divided spray-dried silica gel having a particle diameter of from 20 to 45 μm, a pore volume of 1.5 cm$^3$/g and a specific surface area of 260 m$^2$/g were suspended in 900 ml of ethylbenzene and admixed while stirring with 55.2 ml of diethylaluminum chloride (110.4 mmol; 2M in heptane). During this addition, the temperature rose from 23 to 40° C. After stirring for another 10 minutes, 417.3 ml of (n-butyl)$_{1.5}$(octyl)$_{0.5}$ magnesium (0.875 M in n-heptane) were added, resulting in a temperature increase from 38 to 52° C. The suspension was then heated to 60° C. and stirred at this temperature for 30 minutes. After cooling to room temperature, a solution of 40.3 ml of ethanol in 100 ml of ethylbenzene was slowly added dropwise at such a rate that the reaction temperature remained below 40° C. This mixture was stirred at room temperature for 30 minutes and the resulting solid was subsequently filtered off, washed twice with heptane and once with pentane and dried at room temperature under reduced pressure. 178.2 g of the silica gel on which the magnesium compound had been deposited were obtained.

Example 2
Preparation of the Catalyst System 13.1 ml of titanium tetrachloride were added to a suspension of 23.2 g of the silica gel on which the magnesium compound had been deposited obtained from example 1 in 100 ml of ethylbenzene. During this addition, the temperature rose from 23 to 36° C. After stirring for 10 minutes, 2.33 ml of THF were added, whereupon the temperature rose from 33 to 41° C. After stirring for another 10 minutes, 45.3 g of silicone oil AK 100 000 (Wacker Chemie, with the figure 100 000 indicating the viscosity) dissolved in 200 ml of ethylbenzene were added and the suspension was stirred at room temperature for 1 hour. The solid obtained in this way was subsequently filtered off, washed twice with heptane and once with pentane and dried at room temperature under reduced pressure. 31.2 g of the catalyst system were obtained.

Example 3
Preparation of the Catalyst System 12.3 ml of titanium tetrachloride were added to a suspension of 21.9 g of the silica gel on which the magnesium compound had been deposited obtained from example 1 in 100 ml of ethylbenzene. During this addition, the temperature rose from 23 to 35° C. After stirring for 10 minutes, 2.2 ml of THF were added, whereupon the temperature rose from 32 to 41° C. After stirring for another 10 minutes, 3.1 g of silicone oil AK 100 000 dissolved in 50 ml of ethylbenzene were added and the suspension was stirred at room temperature for 1 hour. The solid obtained in this way was subsequently filtered off, washed twice with heptane and once with pentane and dried at room temperature under reduced pressure. 29.9 g of the catalyst system were obtained.

Example 4 (Comparative example)
Preparation of a Catalyst System without Silicone Oil 15.1 ml of titanium tetrachloride were added to a suspension of 26.9 g of the silica gel on which the magnesium compound had been deposited obtained from example 1 in 100 ml of ethylbenzene. During this addition, the temperature rose from 24 to 41° C. After stirring for 5 minutes, 2.69 ml of THF were added, whereupon the temperature rose from 36 to 45° C., and the suspension was then stirred at room temperature for 1 hour. The solid obtained in this way was subsequently filtered off, washed twice with heptane and once with pentane and dried at room temperature under reduced pressure. 39.9 g of a catalyst system without silicone oil were obtained.

Examples 5 to 7
Polymerization

The polymerizations were carried out in a 10 l stirring autoclave. At room temperature and under nitrogen, 1 g of TEAL (triethylaluminum) together with 5 l of isobutane was introduced into the autoclave. The autoclave was then pressurized with ethene to a total pressure of 37 bar. The contents of the autoclave were then heated to 68° C. while stirring and the weight indicated in table 1 of the catalyst systems from examples 2 to 4 was then injected using ethylene pressure and the polymerization conditions of 40 bar total pressure and an internal reactor temperature of 70° C. were subsequently set by automatic regulation. After 1 hour, the polymerization was stopped by venting.

Table 1 below gives the productivity of the catalyst systems used (from examples 2 to 4) for examples 5 and 6 according to the present invention and for comparative example 7 and also reports some of the properties of the polymers obtained therefrom.

TABLE 1

Preparation of polymers using the catalyst system of the present invention (Example 5 and 6) and using a catalyst system not according to the present invention (comparative experiment example 7)

| | Catalyst used | | Properties of the polymer | |
|---|---|---|---|---|
| Example No. | from Ex. | Weight (mg) | Productivity (g/g)[a] | Density[b] (g/cm$^3$) | Viscosity[c] (dl/g) |
| 5 | 2 | 54 | 32 400 | 0.9380 | 25.73 |
| 6 | 3 | 43 | 39 000 | 0.9353 | 33.61 |
| 7 (C) | 4 | 47 | 20 000 | 0.9345 | 25.80 |

[a]g of polymer per g of catalyst;
[b]density determined in accordance with DIN 53479;
[c]determined in accordance with ISO 1628.

We claim:

1. A process for preparing catalyst systems of the Ziegler-Natta type, which comprises the following steps:
   A) bringing an inorganic metal oxide on which a magnesium compound has been deposited into contact with a tetravalent titanium compound to form an intermediate,
   B) optionally, bringing the intermediate obtained in step A) into contact with an electron donor compound and
   C) bringing the intermediate obtained in step A) or B) into contact with a polysiloxane.

2. The process for preparing catalyst systems as claimed in claim 1, wherein the inorganic metal oxide on which a magnesium compound has been deposited is obtained by a process comprising the following steps:
   a) optionally, bringing the inorganic metal oxide into contact with an organometallic compound of group 13 of the Periodic Table, (according to IUPAC 1985) to form an intermediate,
   b) bringing the intermediate obtained in step a) or the inorganic metal oxide into contact with the magnesium compound $MgR_nX_{2-n}$,
      where X are each, independently of one another, fluorine, chlorine, bromine, iodine, hydrogen, $NR_2$, OR, SR, $SO_3R$ or OC(O)R, and R are each, independently of one another, a linear, branched or cyclic $C_1$–$C_{20}$-alkyl, a $C_2$–$C_{10}$-alkenyl, an alkylaryl having 1–10 carbon atoms in the alkyl part and 6–20 carbon atoms in the aryl part or a $C_6$–$C_{18}$-aryl and n is 1 or 2,
   and subsequently
   c) bringing the intermediate obtained in step b) into contact with an alcohol of the formula R—OH, where R is as defined above under b).

3. The process for preparing catalyst systems as claimed in claim 2, wherein step a) is required and the organometallic compound is an aluminum compound $AlR_mX_{3-m}$, where X are each, independently of one another, fluorine, chlorine, bromine, iodine, hydrogen, $NR_2$, OR, SR, $SO_3R$ or OC(O)R, and R are each, independently of one another, a linear, branched or cyclic $C_1$–$C_{20}$-alkyl, a $C_2$–$C_{10}$-alkenyl, an alkylaryl having 1–10 carbon atoms in the alkyl part and 6–20 carbon atoms in the aryl part or a $C_6$–$C_{18}$-aryl and m is 1, 2 or 3.

4. The process for preparing catalyst systems as claimed in claim 2, wherein said magnesium compound is $MgR_2$.

5. The process for preparing catalyst systems as claimed in claim 2, wherein the alcohol is ethanol, 1-propanol, 1-butanol, 1-pentanol, 1-hexanol or 2-ethylhexanol.

6. The process for preparing catalyst systems as claimed in claim 1, wherein the inorganic metal oxide used is a silica gel.

7. The process for preparing catalyst systems as claimed in claim 1, wherein the tetravalent titanium compound used is titanium tetrachloride.

8. The process for preparing catalyst systems as claimed in claim 6, wherein the tetravalent titanium compound used is titanium tetrachloride.

9. A catalyst system of the Ziegler-Natta type obtained by a process as claimed in claim 1.

10. A process for the polymerization or copolymerization of olefins at from 20 to 150° C. and pressures of from 1 to 100 bar, wherein the polymerization or copolymerization is carried out in the presence of at least one catalyst system as claimed in claim 9, and an aluminum compound as a cocatalyst.

11. The process for the polymerization or copolymerization of olefins as claimed in claim 10, wherein the aluminum compound used is a trialkylaluminum compound whose alkyl groups each have from 1 to 15 carbon atoms.

12. The process for the polymerization or copolymerization of olefins as claimed in claim 10, wherein the polymerization is carried out in suspension.

13. The process for the polymerization or copolymerization of olefins as claimed in claim 10, wherein ethylene or mixtures of ethylene and C3–C8-α-monoolefins are (co)polymerized.

* * * * *